March 10, 1942.  H. C. GUHL  2,276,035

METHOD OF MOLDING LAMINATED ARTICLES

Filed July 24, 1940

WITNESSES:

INVENTOR
Henry C. Guhl.
BY
ATTORNEY

Patented Mar. 10, 1942

2,276,035

UNITED STATES PATENT OFFICE 2,276,035

METHOD OF MOLDING LAMINATED ARTICLES

Henry C. Guhl, Wilkinsburg, Pa., assignor to Westinghouse Electric & Manufacturing Company, East Pittsburgh, Pa., a corporation of Pennsylvania Application July 24, 1940, Serial No. 347,232

6 Claims. (Cl. 154—2)

This invention relates to the method of molding laminated articles having curved surfaces.

In molding laminated resin impregnated fibrous sheet material, it has been customary to mold flat plate stock and then machine the plate stock to the shape desired. In molding flat plate stock from the composite stack of impregnated sheets, no special problems arise. However, in molding laminated articles having curved surfaces, such as panels for use as the inside lining of refrigerator doors, it has been found to be quite difficult to produce a panel having a substantially uniform thickness and which is free from cracks and visible wrinkles in its surfaces.

In the prior art, trays have been formed from laminated fibrous sheet material impregnated with a resinous binder, but in forming such trays under direct die pressure, it has been necessary to employ inserts at the curved corners and sides of the trays in order to secure a substantially uniform thickness throughout the body of the tray. The use of such inserts is commercially undesirable in that it slows up production, increases the manufacturing costs and often results in an inferior product. Such inserts are entirely undesirable in panels designed for use in refrigerator doors and any method of molding which would necessitate the use of inserts is commercially undesirable.

An object of this invention is to provide for molding laminated articles having curved surfaces from resin impregnated fibrous sheets.

Another object of this invention is to provide for exerting a lateral pull on stacked resin impregnated fibrous sheets while applying heat and pressure for facilitating the shaping of the sheets into an integral unit having curved surfaces.

Figure 1:
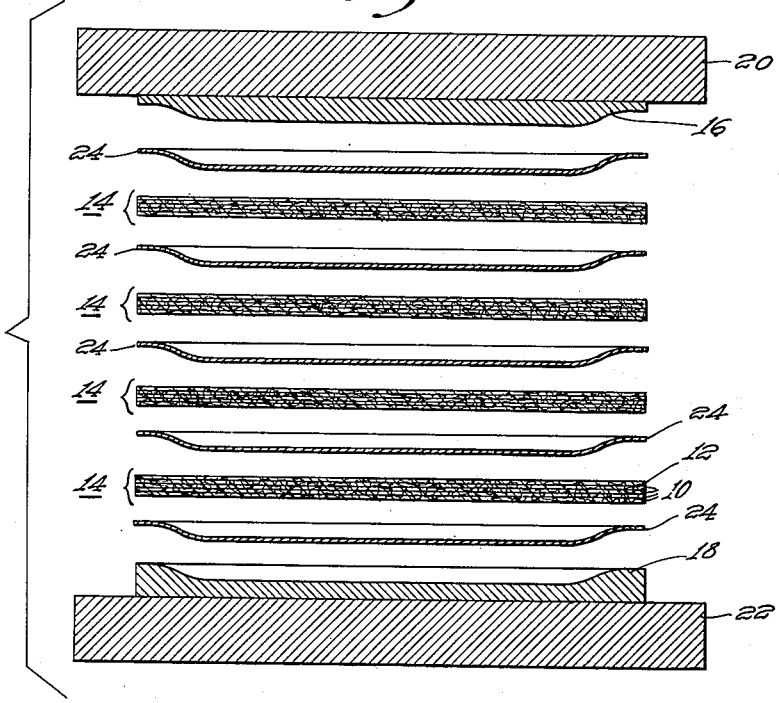
Figure 2:
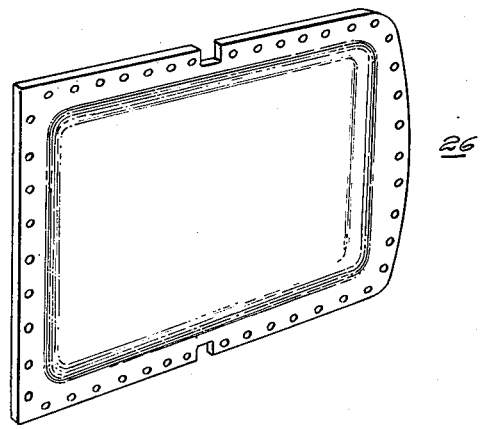

Other objects of this invention will become apparent from the following description when taken in conjunction with the accompanying drawing, in which:

Figure 1 is an exploded view, in section, of apparatus employed in producing the article of this invention; and Fig. 2 is a perspective view of an article produced in accordance with this invention.

As illustrated in Fig. 1, in practicing this invention, a plurality of sheets 10 of fibrous material, such as paper impregnated with phenolic condensation resin are stacked with a surface sheet 12 of fibrous material which has been so impregnated with phenolic condensation resin as to have its outer surface substantially free from the phenolic resin, the outer surface carrying a urea resin coating which contains a pigment, to form the compact and integrally molded unit disclosed and claimed in my copending application, Serial No. 347,233, filed July 24, 1940, and assigned to the same assignee as this invention. The sheets 10 and 12 impregnated with different resins are preferably of substantially the same size and when stacked into groups 14, free from inserts, can be molded under heat and pressure into laminated articles having curved surfaces.

In molding the groups 14 of the stacked laminated resin impregnated fibrous sheets, it is commercially desirable to utilize a method which will permit the molding of a plurality of groups simultaneously. Referring to Fig. 1 of the drawing, there is illustrated the apparatus for practicing the method of this invention. In this figure, cooperating male and female molding dies 16 and 18, respectively, are illustrated as having pre-formed surfaces having the curved contour of the article which it is desired to produce. The dies 16 and 18 are carried by pressure plates 20 and 22, respectively, and are disposed to be heated by any suitable means not shown.

In order to mold the article having the curved surfaces from the group 14 of laminated resin impregnated sheets free from inserts, each group 14 is stacked alternately between thin resilient metallic spacer sheets 24 which have smooth molding surfaces of the same curved contour as the cooperating die members 16 and 18. The metallic spacer sheets 24 are preferably of stainless steel having a thickness between $\frac{1}{32}$ and $\frac{3}{32}$ of an inch and preferably of $\frac{1}{16}$ inch. The smooth molding surface formed on each side of the thin metallic spacer sheet 24 is preferably chromium plated and polished to a mirror-finish. If spacer sheets having a thickness of more than $\frac{3}{32}$ inch are employed, it is found that they do not have the necessary heat conductivity required for good molding characteristics, whereas if the spacer sheets are of less than $\frac{1}{32}$ inch, it is found that the sheets do not have the necessary resiliency for use in the method of this invention, as will be explained more fully hereinafter.

The chromium plated thin metallic sheets 24 are pre-formed to the desired curved contour of the dies by placing the chromium plated thin sheets between the dies and applying sufficient pressure to deform them to the desired shape. In a preferred pre-forming operation, the thin flat chromium plated metallic sheets are stacked alternately with cold rolled steel sheets, not shown, and the alternate assembly is subjected to pressure between the pre-formed dies having the desired curvature to impart the desired curvature to the chromium plated sheets. A lubricating film, not shown, of oil or the like is preferably applied between the chromium plated surfaces of the thin metallic sheets and the adjacent cold-rolled steel sheets to prevent damage to the chromium plate carried by the thin sheets. In deforming the sheets to the desired curvature, it is found that they draw properly without damage to the chromium plating on the surfaces of the sheets and that the resulting sheets will be so resilient as to be capable of being slightly distorted at the curved portions under pressure without damage to the shaped sheet.

With a plurality of groups 14 of the laminated resin impregnated fibrous sheet material stacked alternately with the thin resilient metallic spacer sheets 24, the groups coming in contact with only the spacer sheets 24, disposed in assembled position between die members 16 and 18, heat and pressure are simultaneously applied to the assembly to shape the groups of impregnated sheets and effect the curing of the groups to fix the shape given them. In molding the groups 14 to the desired curved shape, a thin lubricating film of oil or the like, not shown, is preferably applied to the chromium plated surfaces of the thin metallic spacer sheets 24 to prevent sticking of the groups to the molding surfaces. In practice, the molding of eight of the groups 14 is effected simultaneously when subjected to a temperature of 140° C. for a period of time of about 50 minutes under a pressure of about 1500 pounds per square inch.

Under the pressure applied to the assembly, it is found that the resilient thin metallic spacer sheets 24 are distorted somewhat as the die members 16 and 18 approach each other to compact the alternate assembly of the groups 14 and spacer sheets 24. This distortion of the thin metallic sheets 24 under the pressure applied is found to take place at the curved portions of the spacer sheets 24, the spacer sheet so flexing at the curved connecting portions that they exert a lateral pull on the groups of impregnated sheets to cooperate in drawing and shaping the groups of sheets to the curved contour of the dies and spacer members without crinkling or rupturing the laminated group. Further, it is found that by reason of the flexing action of the spacer sheets when they are distorted under pressure, that a proper distribution of the laminated sheet material forming the groups 14 is obtained to give an article having a substantially uniform thickness throughout the body of the article including the curved portions.

Although flexing of the spacer members 24 is obtained as the die members 16 and 22 approach each other, it is quite apparent that when sufficient pressure is applied to the die members to closely compact the alternate assembly of the groups 14 and the spacer sheets 24, that the spacer sheets 24 will conform to the curved contour of the die members and the contour initially given to the preformed spacer sheets. When the pressure is released from the die members 16 and 18, it is found that the thin metallic spacer sheets 24, because of their resiliency, successfully withstand the stresses placed thereon during the molding of the groups 14 to the desired curved contour and that the spacer sheets retain their pre-formed curved contour.

Referring to Fig. 2, there is illustrated a panel 26 of laminated resin impregnated fibrous sheets formed with the curved surfaces from sheets of paper or the like having substantially the same size and free from inserts, formed in accordance with the method of this invention. The panel 26 as illustrated has an exaggerated thickness, in practice it being found that the thickness is between $\frac{1}{16}$ inch and $\frac{3}{32}$ inch. This resulting panel, shown as fabricated with the cutouts for locks and holes for screws for use as the inside panel of refrigerator doors, has an extremely smooth outer surface which is free from any evidence of crinkling or rupturing. Further, by reason of the distortion of the resilient spacer sheets during the molding of the panel, it is found that the resulting panel has a substantially uniform thickness throughout its body including the curved portions thereof.

By practicing the method of this invention, it is quite apparent that panels or other molded laminated articles having curved surfaces may be quickly and economically produced with a minimum number of rejects. Further, since the pre-formed spacer sheets have a long life and the molding method may be practiced without the use of inserts, the initial and operating costs of practicing the method of this invention is greatly reduced as compared to known molding methods.

Although this invention has been described with reference to a particular embodiment thereof, it is, of course, not to be limited thereto except insofar as is necessitated by the prior art and the scope of the appended claims.

I claim as my invention:

1. The method of molding laminated articles having curved surfaces between dies of predetermined curved contour which comprises, stacking fibrous sheets impregnated with heat responsive synthetic resin in groups alternately with thin distortable resilient metallic sheets of a thickness of $\frac{1}{32}$ to $\frac{3}{32}$ inch and of the same curved contour as the dies, applying heat and pressure to the dies to shape the groups of sheets and effect the curving of the groups to fix the shape given them, the thin metallic sheets being distorted during the die pressing operation to exert a lateral pull on the groups of sheets to cooperate in shaping the groups of sheets to the curved contour of the dies.

2. The method of molding laminated articles having curved surfaces between dies of predetermined curved contour which comprises, stacking fibrous sheets impregnated with heat responsive synthetic resin in groups alternately with thin distortable resilient metallic sheets of a thickness of $\frac{1}{32}$ to $\frac{3}{32}$ inch and of the same curved contour as the dies, the alternate stack terminating with the thin metallic sheets at each end of the stack, applying heat and pressure to the dies to shape the groups of sheets and effect the curving of the groups to fix the shape given them, the thin metallic sheets being distorted during the die pressing operation to exert a lateral pull on the groups of sheets to cooperate in drawing and shaping the groups of sheets to the curved contour of the dies and give the groups a substantially uniform thickness and smooth surfaces.

3. The method of molding laminated articles having curved surfaces between dies of predetermined curved contour which comprises, stacking fibrous sheets impregnated with heat responsive synthetic resin in groups alternately with thin distortable resilient stainless steel sheets of a thickness of $\frac{1}{32}$ to $\frac{3}{32}$ inch and having smooth molding surfaces of the same curved contour as the dies, applying heat and pressure to the dies to shape the groups of sheets and effect the curving of the groups to fix the shape given them, the thin stainless steel sheets being distorted during the die pressing operation to exert a lateral pull on the groups of impregnated sheets to cooperate in drawing and shaping the groups of sheets to the curved contour of the dies.

4. The method of molding laminated articles having curved surfaces between dies of predetermined curved contour which comprises, stacking fibrous sheets impregnated with heat responsive synthetic resin in groups alternately with thin distortable resilient metallic sheets of a thickness of $\frac{1}{32}$ to $\frac{3}{32}$ inch and having smooth molding surfaces of the same curved contour as the dies and which carry a lubricating film thereon, positioning the stacked groups of impregnated sheets and thin resilient metallic sheets between the dies with the thin resilient metallic sheets separating the dies and the groups of impregnated sheets, applying heat and pressure to the dies to shape the groups of sheets and effect the curving of the groups to fix the shape given them, the thin metallic sheets being distorted during the die pressing operation to exert a lateral pull on the groups of impregnated sheets to cooperate in drawing and shaping the groups of sheets to the curved contour of the dies and give the groups a substantially uniform thickness throughout the body of each of the groups.

5. The method of molding laminated articles having curved surfaces between dies of predetermined curved contour which comprises, stacking sheets of fibrous material impregnated with thermo-setting resin in groups alternately with thin distortable but resilient metallic sheets having a thickness of $\frac{1}{32}$ to $\frac{3}{32}$ inch, the metallic sheets having the same curved contour as the dies, applying pressure to the dies to distort the resilient metallic sheets and exert a lateral pull on the groups of impregnated fibrous sheets stacked therebetween, the resilient metallic sheets cooperating under the pressure applied to shape the groups of fibrous sheets to the curved contour of the dies, and applying heat to the alternately stacked assembly to effect the curing of the thermo-setting resin to fix the shape given the groups of fibrous sheets.

6. The method of molding laminated articles having curved surfaces between dies of predetermined curved contour which comprises, stacking sheets of fibrous material impregnated with thermo-setting resin in groups alternately with thin, distortable but resilient metallic sheets having a thickness of $\frac{1}{32}$ to $\frac{3}{32}$ inch, the metallic sheets having the same curved contour as the dies, and simultaneously applying pressure and heat to the alternately stacked assembly, the pressure distorting the resilient metallic sheets to exert a lateral pull on the groups of impregnated fibrous sheets stacked therebetween and compacting the fibrous sheets, the resilient metallic sheets cooperating under the pressure applied to shape the groups of fibrous sheets to the curved contour of the dies, the heat applied effecting the curing of the thermo-setting resin to fix the shape imparted to the groups of fibrous sheets under pressure.

HENRY C. GUHL.